United States Patent Office 3,385,764
Patented May 28, 1968

3,385,764
PROCESS FOR PREPARATION OF
FUSAFUNGINE
Jacques Servier, Neuilly-sur-Seine, France, assignor to Biofarma, Societe Anonyme, Neuilly-sur-Seine, Seine, France
No Drawing. Filed Feb. 24, 1964, Ser. No. 347,001
Claims priority, application Great Britain, Feb. 25, 1963, 7,516/63
8 Claims. (Cl. 195—80)

ABSTRACT OF THE DISCLOSURE

Production of antibiotic fusafungine using measured aeration of about 0.7–0.9 liter per minute of air per liter of nutrient medium at pH of about 3.5 to 7 to obtain increased yields and shorter fermentation periods. Permits extraction with organic solids at ambient temperatures.

The present invention relates to a method of preparing the antibiotic fusafungine, and is characterized by improvements in the techniques involved in fermenting, extracting and purifying said product.

Fusafungine has been described in Couchoud French Patent 1,164,181 and its therapeutic applications as an antibiotic and anti-inflammatory agent have been disclosed in the French special medicinal Patent No. 1,084 M. Fusafungine is thus a known antibiotic of known fungal origin produced by, and derivable from, the culture medium of the known *Fusarium lateritium* Wr strain, as disclosed by the French patents mentioned, especially 1,164,181 of Couchoud, which fully describes the basic process and the only microorganism strain known to produce fusafungine.

The use of fusafungine is especially, although not exclusively, of interest for local applications in disturbances of the respiratory tract, of the skin and mucous membranes, as for instance in rhinitis, rhinopharyngitis, sinusitis, bronchitis, wounds, infected ulcers, etc., in suitable forms such as nasal solutions, aerosols, ointments, salves, and the like.

The product when produced and purified by the method of the present invention possesses a range of activity that is especially broad, and is active in low concentrations on most pathogenic microoganisms, while at the same time exhibiting an anti-inflammatory action that is more potent than that of acetylsalicylic acid.

The invention includes a method of culture of the fusafungine-producing strain of *Fusarium lateritium* Wr under submerged conditions with aeration and agitation, in growth-supporting media comprising sterile water containing a source of nitrogen, a source of carbon, a source of growth substances, inorganic salts, and one or more buffer agents.

Suitable media for production of fusafungine are already known. The nitrogen source may include one or more of the following substances incorporated in the medium: yeast extract, aminoacid, peptone, chick-pea meal, fishmeal, soybean meal, soluble corn (maize) extract, soluble wheat extracts, meat extracts, urea, ammonium nitrate. The listed ingredients are readily available in crude form on the market and in such form have the advantage of simultaneously bringing with them trace quantities of growth factors as well as considerable amounts of nutrient minerals.

The carbon source in the medium may be provided by carbohydrates in purified form or in the form of concentrates including saccharose, molasses, soluble starch, glucose, macerated glucose, cerelose, maltose, galactose, fructose, and lactose.

The preferred proportion of the carbon-donor material in the medium for the production of fusafungine according to the invention is from 3 to 7% of the weight of the fermentation medium.

The inorganic salts are selected so as to introduce into the medium at least one of the ions from each of the following two series: chloride, phosphate, nitrate, sulfate, carbonate, citrate, and tartrate; and sodium, potassium, ammonium, calcium, magnesium, zinc, iron and copper.

The pH value in the fermentation medium may vary over the relatively wide range of 3.5 to 7, usually 4.5 to 7, and should preferably be within the narrower range of 5.5–6 at the start of the fermentation. The pH is held within these ranges by addition of buffer agents such as phosphate, citrate, tartrate, or acetate buffer solutions. This aspect of the procedure of the present invention is a significant advance over previous procedure, as exemplified by the above-identified French patents, in which it was necessary to maintain the pH within much narrower limits, in fact at about 6.5, which required periodic neutralization. Such periodic neutralization is obviated by the method of the present invention.

The fermentation temperature may vary as from about 25 to 33° C., but a preferred operating range is 29–30° C. in order to obtain the maximum content of fusafungine in the mycelium produced by the fermentation.

According to the present invention, the fermentation time is notably reduced by aerating the culture at a rate of about 0.7–0.9, preferably about 0.8, liter per minute air per liter of the nutrient solution, and simultaneously agitating the solution. Under these conditions, from 60 to 70 hours is usually a suitable fermentation period yielding satisfactory results. This is in striking contrast to the previously required fermentation times of 20 to 25 days in immobile culture and 6 to 10 days in submerged culture, as shown by the above-identified French patents, representing a reduction to approximately one-third of the previously required submerged frementation period.

The development of the culture is monitored by taking a one-liter sample of the fermentation must (broth plus mycelium) every 5 hours and measuring the antibiotic content in the sample by paper chromatography or other suitable analytical procedure. Paper chromatography is an especially convenient analytical tool and, when employed, the degree of migration (Rf) of fusafungine utilizing bromophenol blue in ammoniacal solution as solvent is between about 0.81 and 0.85. The fermentation process is discontinued when the fusafungine content in successive samples is found not to have increased materially.

After completion of the fermentation reaction, the solids are preferably separated from the culture medium, as by filtration. The solid fermentation product, after separation from the culture medium, is then treated with an organic solvent for the desired fusafungine. Extraction of the fusafungine from the filter cake with an organic solvent therefor is accomplished at ambient (normal room) temperatures, although others can be used if desired. This is in contrast to the teaching of the above-identified French patents which require extraction of the fusafungine from the fermentation solids at reflux. Solvents which are suitable for extraction of the fusafungine are known. In general, they comprise methanol and other lower-aliphatic alcohols, methyl ethyl ketone and other lower-alkyl ketones, ethyl acetate and other lower-alkyl aliphatic acid esters, hexane and other liquid lower hydrocarbons, especially lower-aliphatic hydrocarbons, and the like. The extract is then preferably concentrated under reduced pressure, the concentrate dissolved in a liquid lower hydrocarbon such as hexane, and the solution thus obtained subjected to extraction with an aqueous alcohol mixture, preferably an aqueous lower-aliphatic alcohol mixture, whereafter the alcohol is eliminated, preferably by distillation under reduced pressure, to yield the fusafungine product in the form of a precipitate. The product may if desired and preferably is further purified by counter-current extraction of a liquid lower hydrocarbon, e.g. hexane, solution thereof using an aqueous alcohol, preferably a lower-aliphatic alcohol, especially aqueous methanol, followed by crystallization of the fusafungine from the extract by evaporation of the alcohol, thereby increasing the water content of the remaining concentrate, or by direct addition of water to the concentrate, all as further disclosed in detail hereinafter.

Some examples of the working of the invention will now be described without limitation.

EXAMPLE 1

In a 5-liter balloon flask provided with two tubes, one of which is adapted for subsequent connection to a source of sterile air, 2 liters of fermentation medium are prepared according to the following formulation:

|  | Percent |
|---|---|
| Peptone | 1 |
| Macerated glucose | 3 |
| Sodium nitrate | 0.1 |
| Monohydric potassium phosphate (HK$_2$PO$_3$) | 0.1 |
| Magnesium sulfate | 0.05 |
| Potassium chloride | 0.05 |
| Water, q.s.p. 100%. | |

Both openings of the flask are stopped with cotton wool and the medium is sterilized by placing it in an autoclave for 30 minutes at 120° C. The flask is then cooled to 29–30° C. and a small sample is taken to check the sterility and the pH value which should be approximately 5.

The spores from an inclined culture of the fusafungine-producing strain of *Fusarium lateritum* Wr on a gelose medium (oatmeal 50 g., gelose 20 g., sodium chloride 5 g., distilled water 1000 cm.³) are extracted with sterilized distilled water to obtain a suspension containing about 600,000 spores per ml. This suspension is then used to seed the medium prepared as earlier described. The contents of the flask are incubated at 27° C. Sterile air is injetced into the liquid to effect thorough agitation and uniform supply of oxygen into the medium.

After 55 hours of fermentation, the balloon flask is transferred under aseptic conditions into a metal reactor of about 100 liters capacity containing 60 liters of sterile medium prepared as follows:

|  | Percent |
|---|---|
| Peptone | 0.5 |
| Saccharose | 4 |
| Ammonium nitrate | 0.5 |
| Dihydric potassium phosphate | 0.1 |
| Potassium chloride | 0.05 |
| Magnesium sulfate | 0.05 |
| Ferric sulfate | 0.002 |
| Water, q.s.p. 100%. | |

The culture is incubated at a temperature of 28° C. in the reactor for 60 hours with mechanical agitation and constant aeration. The resulting broth is seeded into 600 liters of a sterile medium, contained in a metal fermenting vat of 1,800 liter capacity, prepared according to the following formulation:

|  | Percent |
|---|---|
| Saccharose | 5 |
| Cerelose | 0.5 |
| Ammonium nitrate | 1 |
| Sodium chloride | 0.3 |
| Magnesium sulfate | 0.25 |
| Potassium chloride | 0.03 |
| Bacon oil | 0.1 |
| Water, q.s.p. 100%. | |

The culture is incubated for 55 hours at 28° C. with constant forced aeration and agitation, and the broth is seeded into the production medium. In a fermentation vat 12 cu. m. in capacity provided with suitable stirring means, a temperature-control jacket, sterile air-injecting and dispersing means, and means for automatically injecting sterile anti-foaming agent if required, there are prepared 6 cu. m. of a nutrient medium of the following formulation:

|  | Percent |
|---|---|
| Saccharose | 5.5 |
| Cerelose | 0.5 |
| Ammonium nitrate | 1 |
| Sodium chloride | 0.3 |
| Dihydric potassium phosphate | 0.5 |
| Magnesium sulfate | 0.25 |
| Water, q.s.p. 100%. | |

The medium is sterilized by heating it at 120° C. for 40 minutes and is then cooled to 30° C. After seeding, the medium is incubated for about 60 hours, the temperature being maintained at 30° C. Throughout the period of fermentation, agitation by means of a vertical shaft on which five horizontal blades are mounted is maintained at a rate of at least 20, usually 20–40, and frequently as high as 90 r.p.m. and sterile air is injected into the bottom of the vat at a rate of 4.8 cu. m. per minute by means of the air-dispersing device. Fermentation is arrested when about 90% of the carbohydrates have been consumed. The average fusafungine content in the fermentation must (broth plus mycelium) is then found to be about 0.5 to 0.8 g. per liter. The fermentation must is filtered under pressure and the content of the filter-press frames is washed with 2 cu. m. water, whereafter the filter cake is partially dried in a blast of compressed air. The mycelium is then dried in a ventilated oven at 70° C. for 30 hours, and thereafter ground.

The yield obtained is 88 kg. of dry product, containing 5.71% fusafungine. This is extracted from the crude product as follows: the dry powder is suspended in 836 l. methanol, and 44 l. of an acetic buffer (sodium acetate-acetic acid buffer system) at pH 4.25 (0.05 M) is added. The mixture is agitated for one hour at ordinary temperature, then drained to separate the exhausted powder from the methanol solution. This solution is transferred into an evaporator in which its volume is reduced to 200 l. 100 liters of hexane are added, followed by 200 liters of water with agitation. After 15 minutes of agitation, the mixture is allowed to stand for 30 minutes and the underlying phase is drawn off. The hexane extract is exhausted with three 25 l. batches of a methanol/water mixture, 3/1 by volume. The methanol mixture is then concentrated to 12.5 liters under reduced pressure. In this concentration step, the methanol is evaporated so that the water content of the residue increases regularly and the fusafungine precipitates. Water can also be added to effect this desired precipitation.

The resulting suspension is placed in a balloon flask equipped with a scraper-agitator device, and agitation is effected for 48 hours in an ice water bath. The antibiotic is isolated from the mother liquor by filtration through a Buchner filter. The filter cake is washed with 5 l. of a methyl alcohol and water mixture (1/2.5 by volume) cooled to 4° C. After drying in an oven at reduced pressure, 2.805 kg. of a greyish-yellow crude product is obtained.

This crude product is solubilized in 140 liters anhydrous undenatured methyl alcohol, then 100 g. of decolorizing carbon black, and 100 g. of a filtering aid were added. The mixture is agitated for 30 minutes. The carbon black, filtering agent and insoluble impurities are filtered out. The filter cake is washed with 14 l. of methyl alcohol. The filtrate is placed in a receiving vessel, and 280 l. of distilled water at 70° C. temperature are poured in with agitation. While continuing to agitate slowly, the mixture is allowed to cool gradually to a temperature of about 35° C. Crystallization is then initiated by adding a few crystals of pure fusafungine, and agitation is continued another 12 hours. The crystallization is allowed to proceed for 48 hours at +4° C. The pure fusafungine crystals are collected by filtration. The filter cake is washed with 10 l. of a methanol/water (1/2 by volume) mixture preliminarily cooled to +4° C. and then with 20 l. of distilled water. The crystals are dried in an oven at 40° C. under reduced pressure. A yield of 2.110 kg. pure fusafungine antibiotic has thus been obtained.

It will be understood that the foregoing example is susceptible of many variations both as concerns the conditions of fermentation and the conditions of extraction and purification. Since the fusafungine has practically zero solubility in water, the antibiotic is concentrated in the mycelium, but it is not indispensable to separate this latter by filtration or centrifugation in order to extract the active principle. A few variations of the above example are described below.

EXAMPLE 2

To one liter of fermentation must prepared as in Example 1 there is added, with agitation, 0.25 l. normal butyl alcohol, the mixture is adjusted to pH 4 (±0.3) with hydrochloric or acetic acid, and agitation is maintained for 30 minutes under constant pH conditions. After allowing the mixture to stand for 2 hours, the lower phase is drawn off.

The exhausted mycelium is then isolated from the butanol extract by filtration in the presence of a filter aid such as "Super-cel" (diatomaceous earth-"Diatoma fossil silicium"). The butanol extract is concentrated under reduced pressure to the consistency of a viscous syrup, yellowish brown in color, which contains the antibiotic. This syrup is solubilized in hexane. The solution is then subjected to three successive extracting steps with a small volume of a mixture of alcohol and water (85 parts of methanol and 15 parts of water) non-miscible with hexane. The alcohol extracts are combined, and reduced to a low volume in a vacuum. The antibiotic precipitates as a yellowish solid progressively as the alcohol concentration in the solution drops. The precipitation of the fusafungine is a maximum after reduction to ⅕ of the initial volume, and is practically complete after 48 hours at +4° C. The antibiotic is recovered in a crude state by filtration, then is dried under reduced pressure.

EXAMPLE 3

A fermentation must prepared as in Example 1 is adjusted to pH 6.5, and is exhausted with methylisobutylketone or methylethylketone. The ketone extract is separated and concentrated to a syrup which is then purified as in Example 1.

EXAMPLE 4

The fermentation must obtained as in Example 1 is exhausted to pH 9 by means of ethyl acetate or amyl acetate. The organic solvent is separated, washed with a buffer solution at pH 4.25 (the acetate buffer of Example 1) and concentrated to a syrup which is then purified as in Example 1.

EXAMPLE 5

By filtering the fermentation must without first altering its pH value the antibiotic can be retained with the mycelium in the filter cake, whereby the major part of the impurities soluble in the filtrate can be eliminated. The addition of a filter aid is not essential. The filter cake is washed, then dried in a ventilated oven, and finely ground. The active substance can be extracted by means of any one or more of the following solvents: ethyl acetate, isoamyl acetate, butyl acetate, methyl alcohol, ethyl alcohol, isopropyl alcohol, n-butyl alcohol, acetone, methylethylketone, methylisobutylketone, ethyl ether, isopropyl ether, butyl ether, benzene, hexane, petroleum ether, chloroform, carbon tetrachloride, methylene chloride, dichlorothane, trichlorothane, pyridine, and others. All the solvents listed are able to dissolve fusafungine, but some of them do so more selectively than others, and a more or less large proportion of the impurities are retained in the residual filter cake. The exhausted filter cake is removed by filtration and the filtrate is concentrated to a low volume. The resulting syrupy concentrate is solubilized in hexane or petroleum ether, and the active principle is then extracted from it by means of a water/methanol mixture, as described in Example 1.

It is to be understood that the invention is not to be limited to the exact details of operation or exact compounds or compositions shown or described herein, as obvious modifications and equivalents will be apparent to one skilled in the art, and the invention is therefore to be limited only by the scope of the appended claims.

I claim:

1. A procedure for the fermentative production, from the fusafungine-producing strain of *Fusarium lateritium* Wr by aerobic fermentation, of the antibiotic fusafungine, having antibiotic and anti-inflammatory properties, the steps of:
    (a) conducting the aerobic fermentation with agitation in submerged culture in a liquid nutrient medium for supporting growth of the fusafungine producing strain employing aeration on the order of about 0.7 to about 0.9 liter per minute of air per liter of nutrient medium, and
    (b) maintaining the pH range of the culture medium between about 3.5 and about 7.

2. Procedure according to claim 1, wherein a buffer system is employed to maintain the desired pH range.

3. Procedure according to claim 2, wherein the buffer system is selected from the group consisting of phosphate, citrate, acetate, and tartrate buffer systems.

4. Procedure according to claim 1, including the added step wherein the fusafungine is extracted from the culture medium with an organic solvent therefor at ambient temperatures.

5. Procedure according to claim 4, wherein the solid fermentation product is separated from the culture medium and the fusafungine extracted from the separated solids with an organic solvent therefor at ambient temperatures.

6. Procedure according to claim 4, wherein the solvent is selected from the group consisting of methanol, methyl ethyl ketone, ethyl acetate, and hexane.

7. Procedure according to claim 1, wherein the aeration rate under (a) is about 0.8 liter per minute of air per liter of nutrient medium.

8. Procedure according to claim 1, wherein the pH under (b) is maintained between about 4.5 and 7.

References Cited

UNITED STATES PATENTS

| | | | |
|---|---|---|---|
| 3,147,184 | 9/1964 | Gaeumann et al. | 167—65 |
| 3,148,119 | 9/1964 | Rao et al. | 167—65 |

FOREIGN PATENTS

| | | |
|---|---|---|
| 1,021,824 | 2/1953 | France. |
| 1,164,181 | 10/1958 | France. |

OTHER REFERENCES

Prescott, S. C., et al.: "Industrial Microbiology," 3rd., McGraw-Hill Book Co., Inc., N.Y., 1959, p. 781 relied on. (Copy in Gr. 170.)

"Nature," vol. 160, No. 4053, July 5, 1947, pp. 31–32. (Copy in Scientific Library.)

MAURICE W. GREENSTEIN, *Primary Examiner.*

A. LOUIS MONACELL, D. M. STEPHENS,
*Examiners.*